(12) United States Patent
Sundararajan et al.

(10) Patent No.: US 11,100,210 B2
(45) Date of Patent: Aug. 24, 2021

(54) HOLOGRAPHIC OBJECT AND USER ACTION COMBINATION-BASED AUTHENTICATION MECHANISM

(71) Applicant: International Business Machines Corporation, Armonk, NY (US)

(72) Inventors: Mukundan Sundararajan, Bangalore (IN); Siddharth K. Saraya, Raniganj (IN)

(73) Assignee: International Business Machines Corporation, Armonk, NY (US)

(*) Notice: Subject to any disclaimer, the term of this patent is extended or adjusted under 35 U.S.C. 154(b) by 322 days.

(21) Appl. No.: 16/171,913

(22) Filed: Oct. 26, 2018

(65) Prior Publication Data

US 2020/0134156 A1 Apr. 30, 2020

(51) Int. Cl.

| H04L 9/00 | (2006.01) |
|---|---|
| G06F 21/36 | (2013.01) |
| G06F 3/01 | (2006.01) |
| G06K 9/00 | (2006.01) |
| G03H 1/00 | (2006.01) |

(52) U.S. Cl.
CPC .......... *G06F 21/36* (2013.01); *G03H 1/0011* (2013.01); *G06F 3/011* (2013.01); *G06K 9/00335* (2013.01); *G06K 9/00926* (2013.01); *G06F 2221/2103* (2013.01); *G06F 2221/2133* (2013.01)

(58) Field of Classification Search
CPC .............. G06F 21/36; F06F 2221/2103; F06F 2221/2133
See application file for complete search history.

(56) References Cited

U.S. PATENT DOCUMENTS

| 5,095,194 A | 3/1992 | Barbanell |
|---|---|---|
| 5,306,899 A | 4/1994 | Marom et al. |
| 5,920,058 A | 7/1999 | Weber et al. |
| 6,222,650 B1 | 4/2001 | Long |
| 2009/0102603 A1 | 4/2009 | Fein et al. |
| 2014/0125574 A1 | 5/2014 | Scavezze et al. |
| 2015/0169176 A1 | 6/2015 | Cohen et al. |
| 2015/0244747 A1 | 8/2015 | Wickenkamp et al. |
| 2019/0236259 A1* | 8/2019 | Remillet ................. G06F 21/36 |

* cited by examiner

*Primary Examiner* — Beemnet W Dada
(74) *Attorney, Agent, or Firm* — William H. Hartwell; Hunter E. Webb; Keohane & D'Alessandro, PLLC

(57) ABSTRACT

Aspects of the present invention provide an approach for authentication of a user of a computer system by displaying holographic objects in a bounded field of view of a user, identifying movement of the user interacting with the holographic objects, comparing the interacting movement to authentication information linking user authentication to a movement defined within confidence limits, and when the identified user movement indicates the user interacted with the displayed holographic objects within the defined confidence limits, authenticating the user on the computer system.

20 Claims, 10 Drawing Sheets

HOLOGRAPHIC OBJECT AND USER ACTION COMBINATION-BASED AUTHENTICATION MECHANISM

TECHNICAL FIELD

The subject matter of this invention relates generally to machine login authentication. More specifically, aspects of the present invention provide a solution that uses the display of object images, including holographic object images, and the sensing of user interactions with those object images to act as authentication in a machine login authentication process.

BACKGROUND

Digital authentication refers to a group of processes whereby the confidence for user identities is established and presented via electronic methods to an information system. The digital authentication process creates technical challenges because of the need remotely to authenticate individuals or entities over a network.

The National Institute of Standards and Technology (NIST) of the Commerce Department of the United States has created a generic model for digital authentication describing processes used for secure authentication:

Enrollment—an individual applies to a credential service provider (CSP) to initiate an enrollment process. After successfully proving the applicant's identity, the CSP allows the applicant to become a subscriber.

Authentication—after becoming a subscriber, a user receives an authenticator, such as a token, and credentials, such as a user name. The applicant is then permitted to perform online transactions with a relying party within an authenticated session, where the applicant must provide proof of possession of one or more authenticators.

Life-cycle maintenance—the CSP is charged with the task of maintaining the user's credentials over the course of its lifetime and the applicant is responsible for maintaining its authenticators.

Authentication of user information poses special problems with electronic communications, such as vulnerability to attack by a third party tapping into the communication stream and intercepting information. To avoid these problems, extra identity factors may be required to authenticate each party's identity.

In today's world, authentication in digital security systems is ramping up at a very fast pace. In the past, user IDs alone were often implemented for a system login. This reflected an era of trust. Users often needed only to spell out their name or user ID to access their data through a computer processor. But this did not survive long and passwords were added to the authentication process to ensure that even if someone knew a user ID, that person would not also know a password. This system was followed by an era of multiple passwords, tokens, OTP (one true pairing), and biometric authentication steps, among others. One such authentication system is known as CAPTCHA (an acronym for "Completely Automated Public Turing test to tell Computers and Humans Apart"), wherein a user enters a text imbedded in an otherwise complicated image. The CAPTCHA technology attempts to ensure that the entity trying to login is a person (capable of discerning the text from the otherwise complicated image) rather than a machine (presumably incapable of such discernment).

SUMMARY

In general, aspects of the present invention provide an approach for authenticating a user of a computer system by monitoring a user's interactions with one or more holographic objects bounded in the user's field of view and comparing the user's interactions with the one or more holographic objects to a predefined set of authentication information that links user authentication to a user movement defined within confidence limits. In an embodiment, the predefined set of authentication information varies, for example, between each previous and subsequent authentication or at each new authentication.

One aspect of the invention provides a method for authenticating a user of a computer system that comprises at least one holographic image display device and at least one user monitoring device where the method includes: displaying, in response to a request for access by a user and via the at least one holographic image display device, one or more holographic objects in a field of view of the user; identifying via data received from the user, monitoring device movement of the user interacting with the displayed holographic objects; comparing the identified user movement to a predefined set of authentication information that links user authentication to a movement defined within confidence limits of the user interacting with the displayed holographic objects; and authenticating the user when the identified user movement indicates the user interacted with the displayed holographic objects within the defined confidence limits.

In a non-limiting embodiment, the user is not authenticated when the identified user movement indicates the user did not interact with the displayed holographic objects within the defined confidence limits.

In a non-limiting embodiment, the predefined set of authentication information varies between each previous and subsequent authentication. In another non-limiting embodiment, the predefined set of authentication information varies between each previous and subsequent authentication based on user entry at setup of a plurality of defined movements, each of the defined movements corresponding to one in a series of authentications anticipated to follow setup. In yet another non-limiting embodiment, the user is provided a reminder image pattern comprising a reminder of the required predefined set of authentication information for a given authentication. In still another non-limiting embodiment, a cognitive computer system varies the predefined authentication information for each authentication based on a database of possible defined movements provided by the user at setup or a database of personal history of defined movements of the user or both and provides a reminder image therefore. Without limitation, the defined movement can be characterized by parameters selected from a group consisting of: position of object, size of object, color of object, pattern of object, speed of movement, direction of movement, precision of movement, precision of location of object or movement or both, precision of speed, and position of user grip on an object. Still further and without limitation, the defined movement can have a preamble pattern including at least a portion of the defined movement required for the previous authentication, a core authentication pattern, and an ending pattern that adds noise.

Another aspect of the invention provides a computer system for authenticating a user where the system includes: an image display device; a user monitoring device; a memory medium with instructions; a bus coupled to the memory medium; and a processor coupled to the bus that when executing the instructions causes the system to perform a method that includes: displaying, in response to a request for access by a user and via the image display device, one or more objects in a field of view of the user; identifying via data received from the user monitoring device movement of the user interacting with the displayed objects; comparing the identified user movement to a predefined set of authentication information that links user authentication to a movement defined within confidence limits of the user interacting with the displayed objects; and authenticating the user when the identified user movement indicates the user interacted with the displayed objects within the defined confidence limits.

Yet another aspect of the invention provides a computer program product embodied in a computer readable medium that, when executed by a computer device: performs a method for authenticating a user of a computer system comprising at least one image display device and at least one user monitoring device where the method includes displaying; in response to a request for access by a user and via the at least one display device, one or more objects in a field of view of the user, identifying via data received from the user monitoring device movement of the user interacting with the displayed objects; comparing the identified user movement to a predefined set of authentication information that links user authentication to a movement defined within confidence limits of the user interacting with the displayed objects; and authenticating the user when the identified user movement indicates the user interacted with the displayed objects within the defined confidence limits.

Still yet, any of the components of the present invention could be deployed, managed, serviced, etc., by a service provider that offers to implement authentication in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings.

Figure 1:
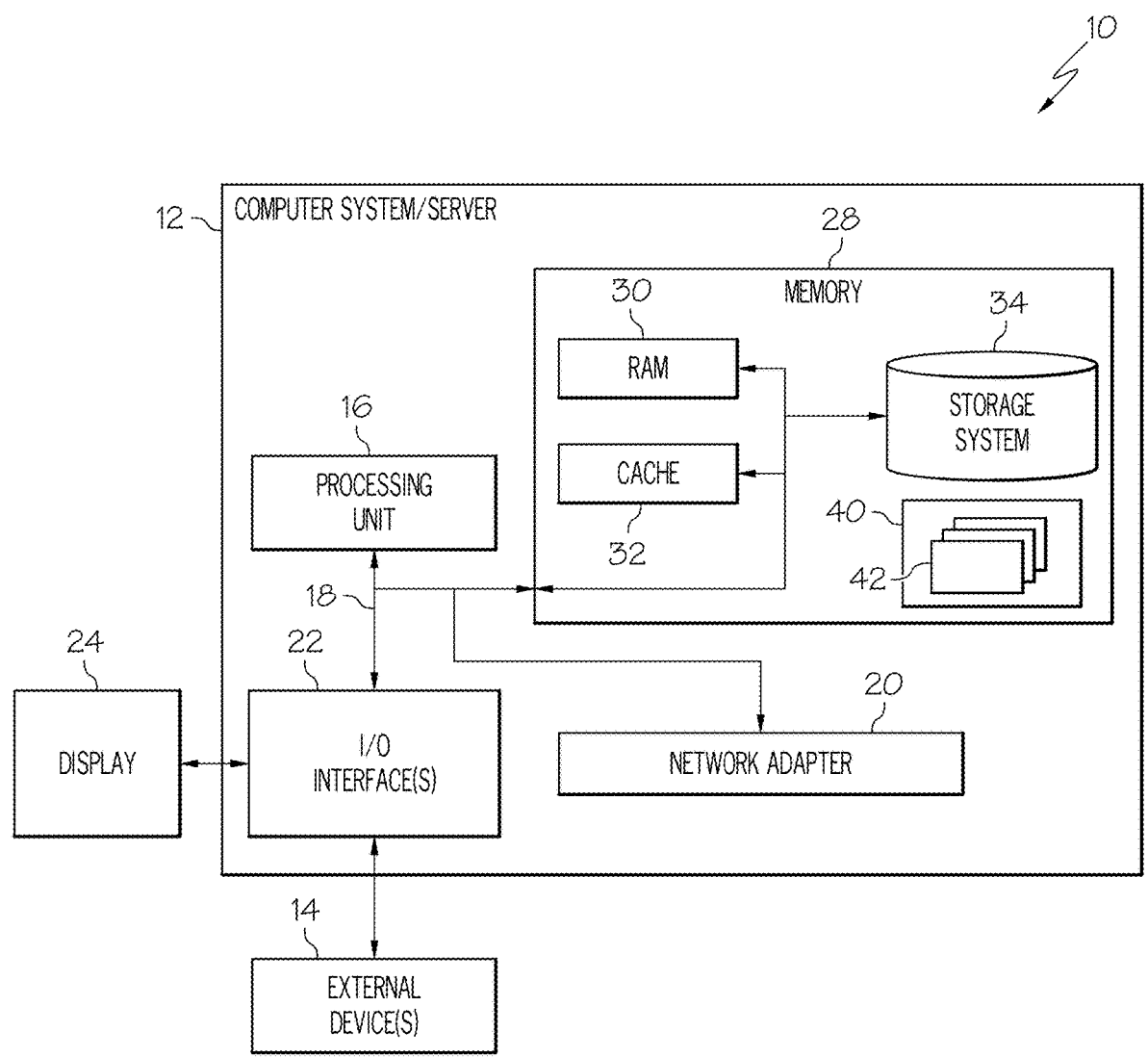
FIG. 1 depicts a data processing system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

The inventors of the current invention have discovered certain deficiencies in current solutions for user authentication and provide herein technology that significantly achieves certain advanced solutions to these deficiencies. As technology continues to progress, the art continues to be in need of enhanced authentication security systems, systems that are difficult for humans or machines to recreate or to breach, and systems that are nevertheless intuitive for users. The security arts need new methods of user authentication to prove identity and to provide access approval to protected computer operating systems, mobile phones, cable TV decoders, automated teller machines (ATMs), etc. These new methods should provide authentication that is difficult to guess, observe, or reverse engineer and yet easy for a user to remember and recreate, particularly without access to other machinery such as key fob authenticators. Such authentication would be a significant improvement in the art.

As indicated above, aspects of the present invention provide an approach for authenticating a user of a computer system by monitoring a user's interactions with one or more holographic objects in a bounded field of view of the user and comparing the user's interactions to a predefined set of authentication information that links user authentication to a movement defined within confidence limits. In a non-limiting embodiment, the predefined set of authentication information varies between each previous and subsequent authentication. In another non-limiting embodiment, the predefined set of authentication information differs for each authentication.

One non-limiting aspect of the present invention provides a process for establishing a series of authentications wherein each authentication in the series corresponds respectively to a series of user requests for access to a computer system. The process comprises two stages. A first setup stage comprises user setup of the series of authentications wherein the user demonstrates a series of authentication actions to be stored in the system and to be iteratively repeated by the user respectively at each of a series of anticipated authentications. A second authentication stage follows therefrom wherein the user enters a first request for access to the system and authenticates the user's identify by undertaking the first authentication action in the series. At a next request for access, the user authenticates identification by undertaking the next authentication in the series. This is repeated until all of the series of authentications has been exhausted. Thereafter, the user may set up a new series of authentications for future requests for access.

Figure 3:
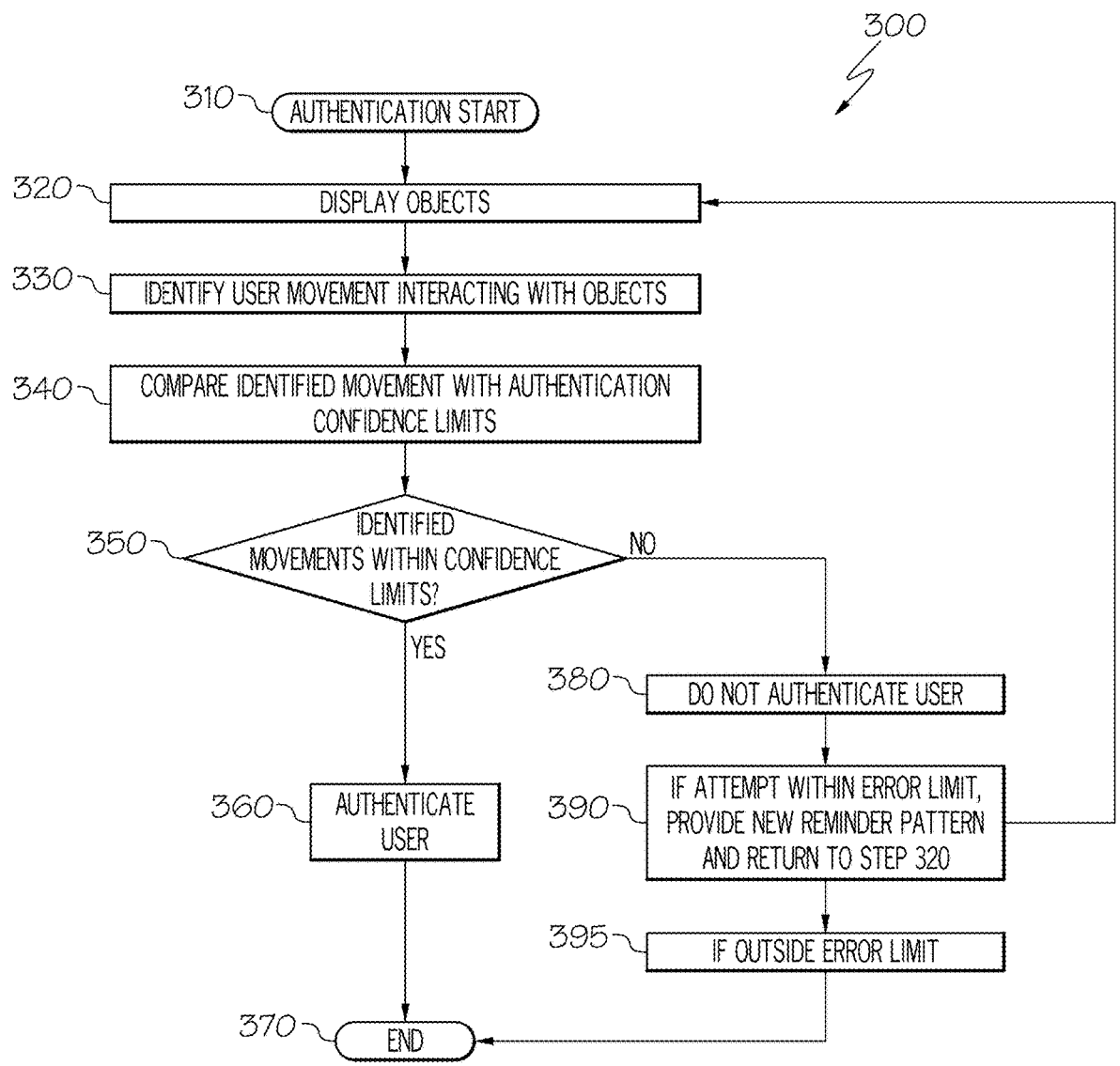
FIG. 3 depicts an example process flowchart according to an embodiment of the present invention.
Figure 4:
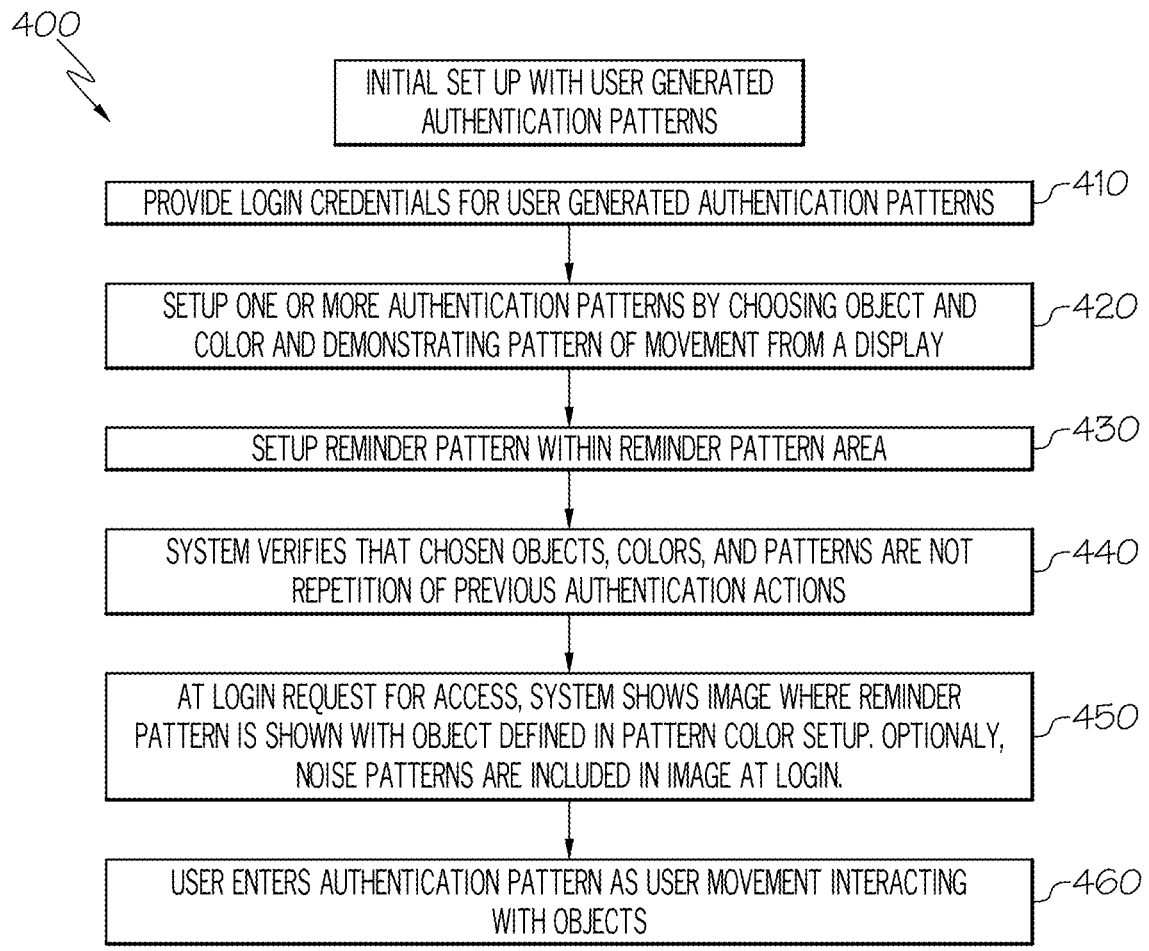
FIG. 4 depicts an example process flowchart according to an embodiment of the present invention.

An exemplary non-limiting embodiment of a setup stage for authentication actions is illustrated in FIG. 4, wherein an exemplary initial set up with user generated authentication patterns 400 is provided. An exemplary non-limiting embodiment of an authentication stage is illustrated in FIG. 3, wherein an exemplary authentication process can be undertaken based on the authentication actions entered by the user in the system as illustrated in FIG. 4.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on, that perform particular tasks or implement particular abstract data types. Computer system/server 12 can be practiced in distributed cloud computing environments where tasks are performed by remote processing devices that are linked through a communications network. In a distributed cloud-computing environment, program modules can be located in both local and remote computer system storage media including memory storage devices.

As shown in FIG. 1, computer system/server 12 in data processing system 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program code embodied on a computer readable medium can be transmitted using any appropriate medium including, but not limited to, wireless, wireline, optical fiber cable, radio-frequency (RF), etc., or any suitable combination of the foregoing.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
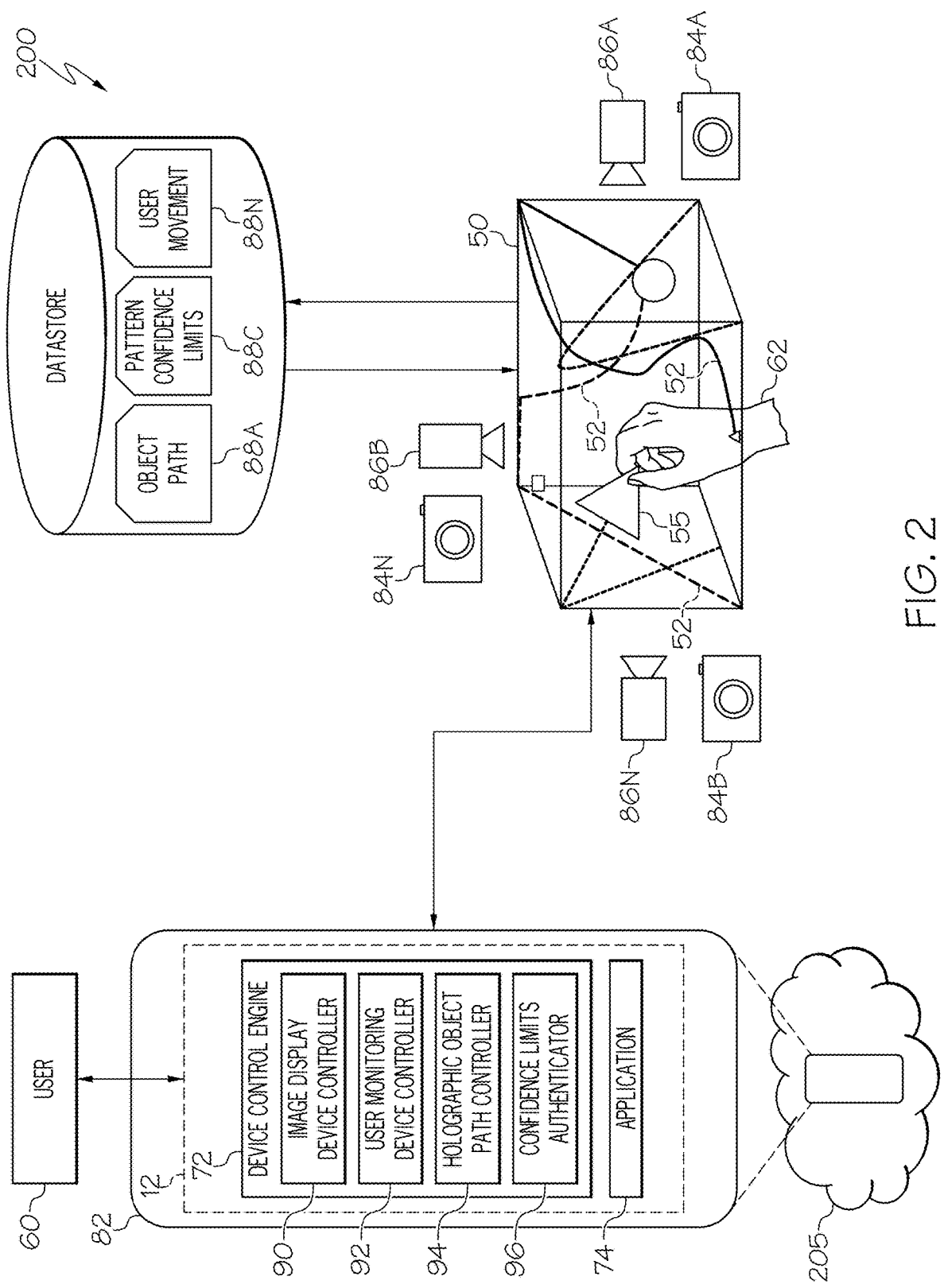
FIG. 2 depicts a system diagram according to an embodiment of the present invention.

Referring now to FIG. 2, a system diagram describing the functionality discussed herein according to an embodiment of the present invention is shown. It is understood that the teachings recited herein can be practiced within any type of networked computing environment 200 (e.g., a cloud computing environment 205). A stand-alone computer system/server 12 is shown in FIG. 2 for illustrative purposes only. In the event the teachings recited herein are practiced in a networked computing environment 200, each device such as user monitoring device 84A-N, image display device 86A-N, or containing device 82 need not have a device control engine (hereinafter "system 72"). Rather, system 72 could be loaded on a server or server-capable device that communicates (e.g., wirelessly) with devices 82, 84A-N, and 86A-N to provide processing therefor. Regardless, as depicted, device control engine 72 is shown within computer system/server 12. In general, device control engine 72 can be implemented as program/utility 40 on computer system 12 of FIG. 1 and can enable the functions recited herein. It is further understood that device control engine 72 can be incorporated within or work in conjunction with any type of system that receives, processes, and/or executes commands with respect to devices 82, 84A-N, and 86A-N (e.g., in a cognitive and/or network computing environment). Such other system(s) have not been shown in FIG. 2 for brevity purposes.

Along these lines, device control engine 72 can perform multiple functions similar to a general-purpose computer. Specifically, among other functions, device control engine 72 can control operation of devices 82, 84A-N, and 86A-N. Device control engine 72 can further control images within a bounded space of the user field of view 50 and holographic object(s) 55 during interactions of user 60 through, for example, user hand 62 with object(s) 55. Device control engine 72 can further control movement and pattern pathway images 52 reflecting current and past movement of objects including object(s) 55 by user 60 through user hand 62. To accomplish this, device control engine 72 can include image display device controller 90, user monitoring device controller 92, holographic object path controller 94, and confidence limits authenticator 96.

Referring again to FIG. 2, display device controller 90, as included in system 72, displays one or more objects in a field of view of a user in response to a request for access by the user. To accomplish this, display device controller 90 can control one or more image display devices. As illustrated, image display device 86A-N are shown generating and controlling holographic object(s) 55 and pathway images 52 within user field of view 50 during interactions of user 60 through user hand 62 with holographic object 55.

Holographic object(s) 55 and pathway images 52 can be retrieved by image display device controller 90 from datastore 88A-N, which is illustrated herein storing authentication object path data, authentication pattern confidence limits data, and user movement data, including user movement history data. The data can be stored as vectors with a speed component or in any method of storage known now or hereafter. Retrieved data can reflect data previously entered by the user at setup, crowd-sourced data retrieved by system 12 through network adaptor 20 or from storage system 34, data from previous logins and authentications by the user, etc. In cases in which one or more prior requests for access have been processed, holographic object(s) 55 and pathway images 52 can include data retrieved during a prior request for access via user monitoring device 84A-N and image display device 86A-N. The data can be a sequence of captured image, biometric, and/or other data (e.g., with each taking a predetermined amount of time after the previous data capture) or, alternatively, a stream of data.

Image display device 86A-N can be any device capable of holographic image display, including any light projecting device capable of generating a holographic image in the field of view of the user where the user is capable of interacting with a holographic image. The holographic image display can be in two-dimensional or three-dimensional space. Image display device 86A-N can be a holographic projecting device and can project holographic images in bounded user field of view 50. In a non-limiting embodiment, image display device 86A-N projects a white light and/or one or more lasers through an interference pattern to produce the holographic image to be projected in user field of view 50 including holographic object(s) 55 and movement and pattern pathway images 52. In a further non-limiting embodiment, 86A-N projects a white light and/or one or more lasers through an interference pattern on a transparent interference medium (not shown) within user field of view 50 wherein holographic object(s) 55 and movement and pattern pathway images 52 are perceived by the user looking through the transparent interference medium and user 60 interacts through user hand 62 with holographic objects perceived by user 60 below the transparent interference medium, thereby creating a bounded field of view.

A holographic image display can be generated on any projection surface including any interference projection medium, any flat interference projection surface, any group of interference projection surfaces, any group of interference projection surfaces bounding the field of view of the user, or any other image projection and/or reflection medium. A holographic image display can be a volumetric image display including, for example, a photophoretic-trap volumetric display.

A holographic image display may also be any three-dimensional display that modulates light at a two-dimensional surface with an edge boundary. Holographic image display includes general holographic displays, lenticular or lenslet displays, nanophotonic arrays, and plasmonic displays as well as all technologies in which a light scattering surface and an image point may be physically distinct.

In some embodiments, multiple holographic projectors can be employed as image display device 86A-N and/or spinning mirrors within one or more holographic projectors as image display device 86A-N can be used to produce an improved three-dimensional effect. It should be understood that the above-described techniques and/or apparatuses used by image display device 86A-N as included in and/or controlled by image display device controller 90 are intended to be illustrative and should not be taken as limiting. In contrast, any solution for generating a holographic image now known or later developed should be envisioned.

Referring again to FIG. 2, user monitoring device controller 92, as included in system 72, monitors movement of user 60 as user 60 interacts with holographic objects 55. To accomplish this, user monitoring device controller 92 can control one or more user monitoring devices 84A-N. As illustrated, user monitoring device controller 92 monitors movement of user 60 through user monitoring devices 84A-N as user hand 62, for example, interacts with one or more holographic objects 55 within field of view 50. User monitoring device 84A-N can be a video device (e.g., a camera, a video camera, an infrared (IR) camera, a broad wavelength electromagnetic detector (such as an IR and visible wavelength detector or an IR, visible, and ultraviolet (UV) detector), or any other device capable of capturing electromagnetic analog images, digital images, and/or the like).

In some embodiments, user monitoring device 84A-N and image display device 86A-N can be encompassed within a single containing device 82, while in others, one or more of user monitoring device 84A-N and/or image display device 86A-N can be stand-alone devices.

Referring again to FIG. 2, holographic object path controller 94, as included in system 72, controls movement of holographic objects 55 through the path of movement generated by user 60. To accomplish this, holographic object path controller 94 can interact with image display device controller 90 and user monitoring device controller 92 to gather data on the movement of user 60 as the user interacts, for example, through user hand 62 with holographic objects 55. As illustrated, holographic object path controller 94 monitors movement of user 60 through user monitoring device controller 92 and position, change of position, and rate of change of position (i.e., movement) of holographic objects 55 and directs image display device controller 90 to move holographic objects 55 through the path of movement generated by user 60 through user hand 62. Holographic object path controller 94 generates data stored in datastore 88A-N as user movement 88N and object path 88A.

Referring again to FIG. 2, confidence limits authenticator 96, as included in system 72, analyzes input data to determine if user authentication action is within confidence limits. To accomplish this, confidence limits authenticator 96 analyzes data from image display device controller 90, user monitoring device controller 92, and holographic objects path controller 94 to determine if a user authentication pattern is within confidence limits. As illustrated, in response to a request for access by a user, confidence limits authenticator analyzes data from image display device controller 90, user monitoring device controller 92, and holographic objects path controller 94 and compares said data to information stored at pattern confidence limits data store 88C to determine if user 60 interacts with holographic objects 55 in a pattern that is within confidence limits. If so, confidence limits authenticator 96 authenticates user and allows access of user to system. If not, confidence limits authenticator 96 does not authenticate user.

Referring again to FIG. 2, an application 74 that utilizes and/or controls the device control engine 72 may operate in the background to perform the authentication process. Additionally, or in the alternative, application 74 can initiate the authentication process in response to a request by user 60 to activate application 74. Additionally, or in the alternative, application 74 may include a control (e.g., a button, switch, etc.) that, when activated by user 60, initiates the authentication process. In any case, application 74, if present, may include one or more of: an image display device controller, a user monitoring device controller, a holographic object path controller, and/or a confidence limits authenticator.

Referring now to flowchart 300 of FIG. 3 (with reference to FIG. 2), a process flowchart 300 according to an embodiment of the present invention is shown. Flow begins at 310 with a user request for access to the system. At 320, a set of objects is displayed with, for example, objects of varying shapes, sizes, and colors. Moreover, in subsequent requests for access, pathways indicating previous movements of the various objects can also be included. These pathways can include a reminder to the user of the next authentication requirement. Additionally, in embodiments, these pathways can also include other decoy paths that can be included as noise to confuse possible third-party observers. At 330, a user interacts with the displayed set of objects and the user's movement is identified via data from user monitoring device 86A-N of FIG. 2. At 340, identified user movement can be compared with authentication confidence limits through a predefined set of authentication information for the user that links user authentication to a movement defined within the confidence limits of the user interacting with the displayed one or more objects. In an embodiment, the predefined set of authentication information can be varied between each authentication session or can be different at each authentication session. At 350, when the identified user movement indicates the user interacted with the set of displayed objects within the defined confidence limits, the user can be authenticated at 360 and the authentication process can be terminated at 370. When the identified user movement indicates the user interacted with the set of displayed objects not within the defined confidence limits, the user is not authenticated at 380. If the authentication error is within predetermined error limits 390, then image display device controller 90 within device control engine 72 can query object path datastore 88A to retrieve, for example, a reminder object path among object paths 52 and provide a new reminder image at display objects 320. Other preset or cognitively-generated hints can also be provided. Error limits at 390 can, for example, reflect a certain number of attempts allowed for authentication at each login or can, for example, reflect how close an attempt comes to an authentication that falls within certain confidence limits, or any other method of applying error limits to an authentication attempt. If an attempt falls within error limits at step 390, steps 330 through 350 can then be repeated until user is authenticated at 360 or, if user error is outside error limits at 395, then the authentication process can end at 370 without user authentication. The user may then return to a fail-safe authentication process with additional security for a further authentication. A fail-safe authentication may, for example, be a password or other two-step authentication system available only through user's chosen authorized device, such as a home computer coupled with a text message or email message.

Referring now to flowchart 400 of FIG. 4 with reference to FIG. 2, FIG. 3, FIG. 8, and FIG. 9, a setup process flowchart 400 is provided for an initial setup of one or more of a series of authentication procedures according to an aspect of the invention. At 410, in an embodiment, a user initially can provide login credentials such as a username. The user can then be presented with a display of possible colors, shapes, sizes, and positions within a bounded user field of view for movement of a set of displayed holographic objects. At 420, the user can set up a plurality of authentication actions by choosing, for example in a series, a holographic object of a given color, shape, and size for movement by the user in a particular pattern and can demonstrate that pattern within bounded user field of view 50 to be monitored by user monitoring device 84A-N. At 430, the user can set up a reminder pattern within a defined reminder pattern area corresponding to each chosen authentication action from 420 and can associate the reminder pattern with one of the plurality of authentication actions. At 440, in an embodiment, user monitoring device controller 92 within device control engine 72 can query the data in object path datastore 88A and can verify that the chosen object, color, and pattern of each chosen authentication action is not a repetition of previous authentication actions or, in another embodiment, is at least a variation between each authentication action or a variation within a series of authentication actions. In a further embodiment, user monitoring device controller 92 within device control engine 72 can query the data in object path datastore 88A and can verify that any reminder action is not a repetition of previous reminder actions.

Referring still to FIG. 4, in an embodiment, once initial setup with user generated authentication patterns and reminder patterns has been undertaken by the user, at an initial login request for access 450, image display device controller 90 within system 12 can then generate an image within user field of view 50 where a reminder pattern (810 of FIG. 8 and 910 of FIG. 9) is shown with the set of displayed holographic objects with patterns and colors defined by the user in step 420. Optionally, noise patterns (820A-N of FIG. 8 and 920 of FIG. 9) can be included in the image within user field of view 50 at login as a decoy to confuse any third-party non-user observer. In a non-limiting embodiment, reminder patterns can be generated new at each authentication session and/or at each repetition of step 450. At 460, the user can then continue the request to access the system by entering the required authentication pattern in which the user interacts with and manipulates holographic object(s) 55 within the established confidence limits.

In an embodiment, setting parameters (including the shape, position, and path of the objects) and how the user moves particular objects within setting parameters to generate authentication information can be different for each authentication session. In a further non-limiting embodiment, a fail-safe pattern can be available in the circumstance where a user does not recollect the next authentication action in a series of authentications. The fail-safe pattern can return an authentication session to an authentication requiring additional authentication steps in lieu of the forgotten authentication pattern.

Figure 5:
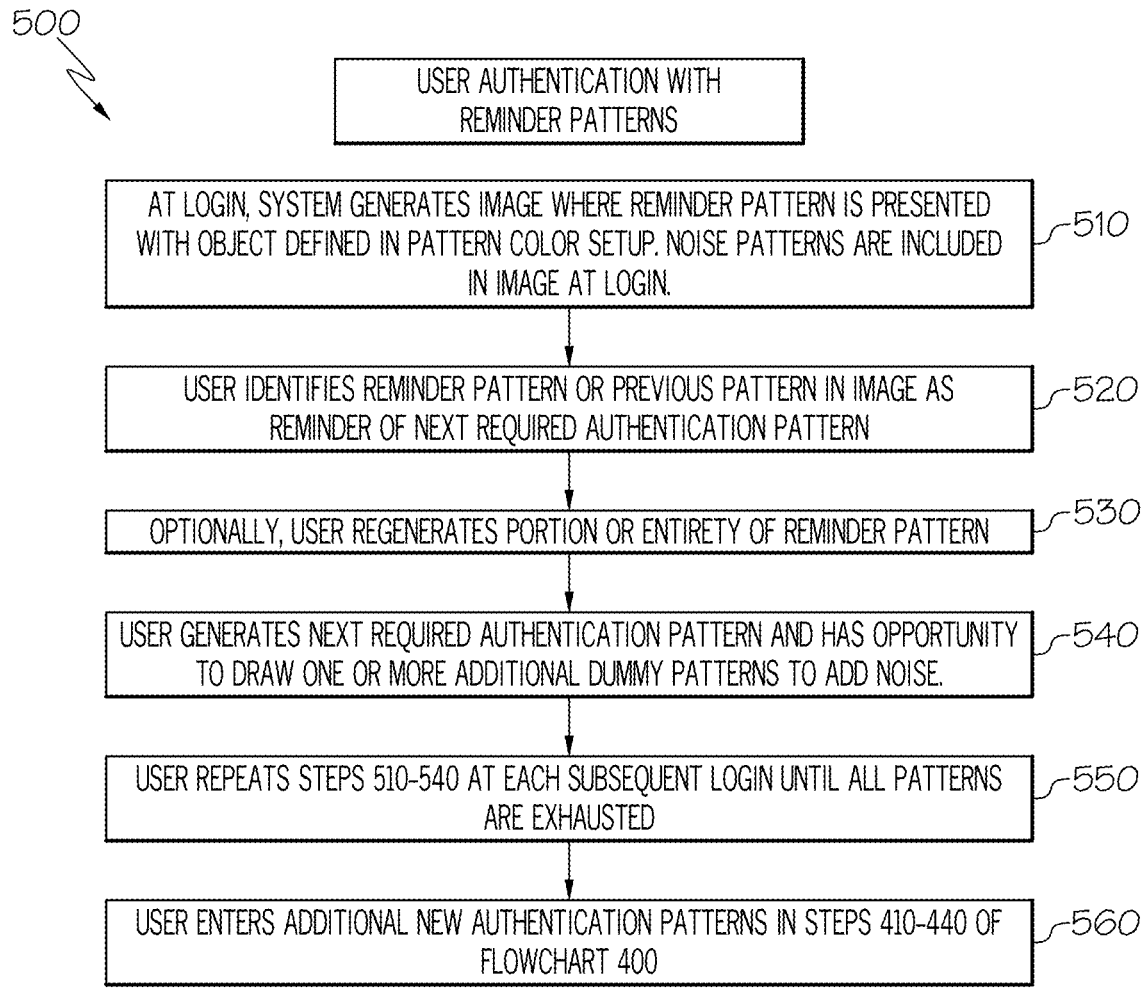
FIG. 5 depicts an example process flowchart according to an embodiment of the present invention.

Referring now to flowchart 500 of FIG. 5 with reference to FIGS. 2-4, a flowchart of a non-limiting embodiment of a user authentication using reminder patterns is provided. At login 510, the system can generate an image comprising a reminder pattern with holographic objects defined in a pattern and color setup. In a non-limiting embodiment, noise patterns 52 are included as a decoy in the image. At 520, the user can identify the reminder pattern. In a non-limiting alternative, when an access request is not the first access request within a series of access requests with corresponding authentications, the user can identify a previous authentication pattern presented in the image as reminder of the next required authentication pattern. At 530, the user can optionally regenerate a portion or the entirety of the reminder pattern. At 540, the user can generate the next required authentication pattern and, optionally, can generate one or more additional dummy patterns to add noise as a decoy for any third-party observer. At 550, the user can repeat steps 510-540 at each subsequent login access request until all previously setup authentication patterns are exhausted. In an embodiment at step 560, the user can enter additional new authentication patterns in steps 410-440 of flowchart 400 for further login authentication or in another embodiment, a cognitive computer can generate new authentication patterns in view of previous authentication patterns and reminders setup by user or in view of user pattern history or both or other information gained and analyzed by the cognitive computer (see, e.g., flowchart 600 at FIG. 6). In a non-limiting aspect of the invention, the uniqueness of each new pattern (including shape, size, speed, direction, user grip, etc.) is difficult to record, recreate, and anticipate for an outside observer, which provides a technological leap over previous authentication technology.

Figure 6:
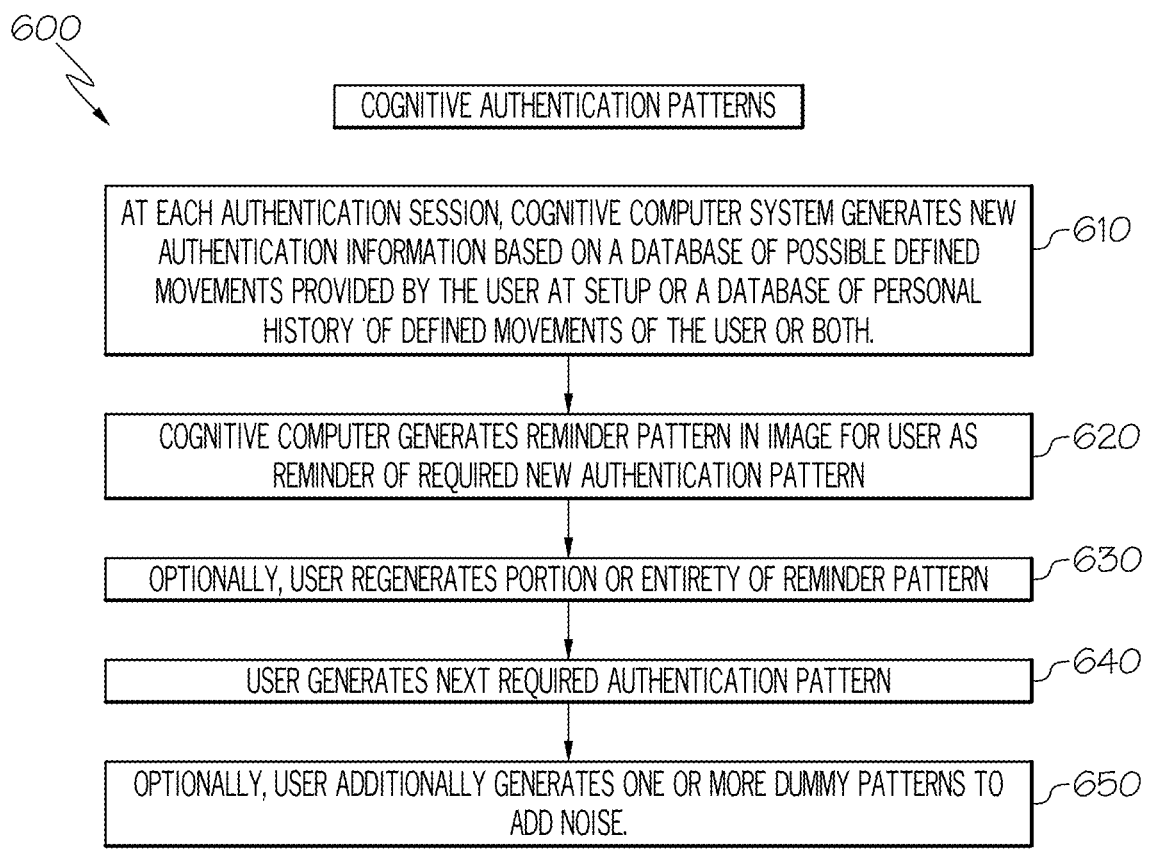
FIG. 6 depicts an example process flowchart according to an embodiment of the present invention.

Referring now to FIG. 6, flowchart 600 provides a non-limiting embodiment of authentication patterns generated by a cognitive computer. At each authentication session 610, a cognitive computer system can generate new authentication information based on a database of possible defined movements provided by the user at setup or a database of personal history of defined movements of the user or both or any other set of information concerning the user that is available to the cognitive computer. At 620, a cognitive computer can generate a reminder pattern in an image within user field of view 50 as a reminder of a required new authentication pattern. At 630, optionally, the user can regenerate a portion or the entirety of reminder pattern. At 640, the user can generate the next required authentication pattern in view of the reminder pattern. At 650, optionally, the user additionally can generate one or more dummy patterns to add noise and confuse any third-party observer.

Generation of new authentication patterns using a cognitive computer can be provided by advanced analytics through, for example, Watson® Visual Recognition™ (a trademark of International Business Machines Corporation of Armonk, N.Y., in the United States and/or other jurisdictions). Cognitive tradeoff analytics may likewise be accomplished through an application-programming interface such as Watson® Tradeoff Analytics API™ (a service mark of International Business Machines Corporation of Armonk, N.Y., in the United States and/or other jurisdictions).

The process flowcharts of FIGS. 3-6 illustrate the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Figure 7:
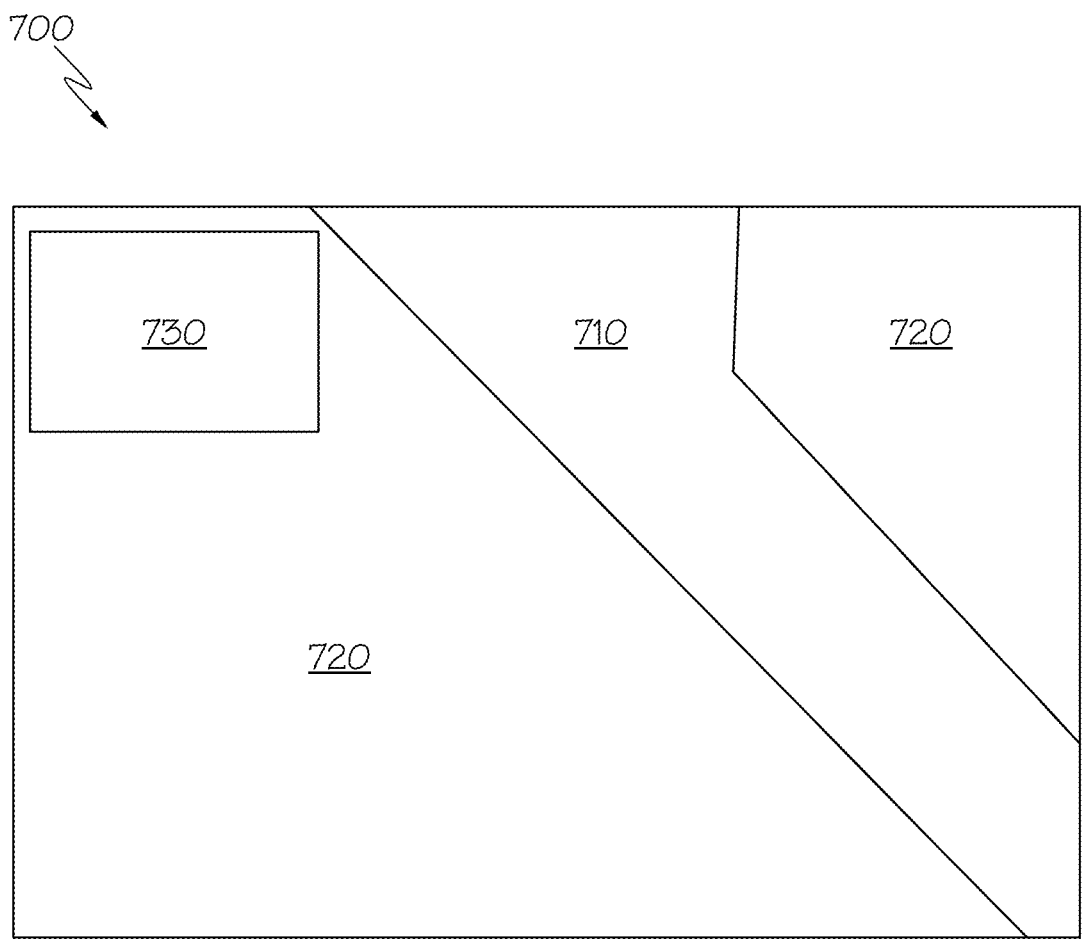
FIG. 7 depicts an example reminder area setup according to an embodiment of the present invention.

Referring now to FIG. 7, an exemplary setup area 700 for hints of prior authentication patterns and next required authentication pattern is illustrated. An area 710 for presentation of the prior pattern and/or the reminder pattern, as well as for the new authentication pattern, is illustrated. Areas 720 for noise and confusion patterns are illustrated. Pickup area 730 for object shape and color is illustrated. An example of pickup area 730 is additionally illustrated in FIG. 8 at element 830.

Figure 8:
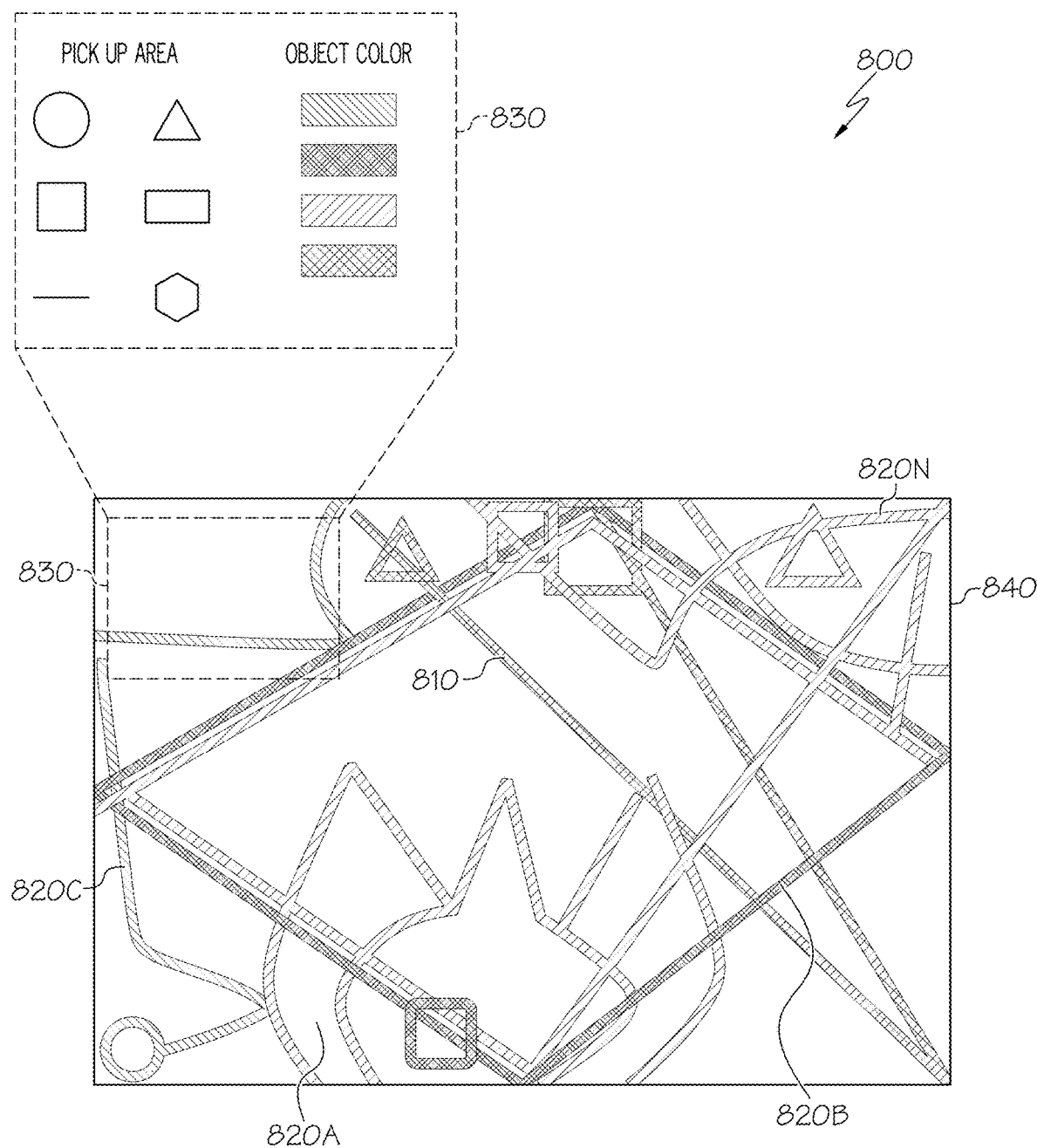
FIG. 8 depicts an example reminder image according to an embodiment of the present invention.

Referring now to FIG. 8, an exemplary login reminder pattern image 840 with included noise (decoy paths) is illustrated. The user has set blue triangle 810 as the reminder pattern. In this example, reminder pattern 810 is the pattern from the prior authentication session. Likewise, in this example, reminder pattern 810 is the reminder pattern for the user to employ in the preamble of the required pattern for authentication. Noise patterns 820A-N are included in reminder pattern 800. Pickup area 830 is included in the upper left corner of reminder pattern image 840 and includes objects that can be selected by the user, as well as colors that can be selected by the user to be applied to selected objects.

Figure 9:
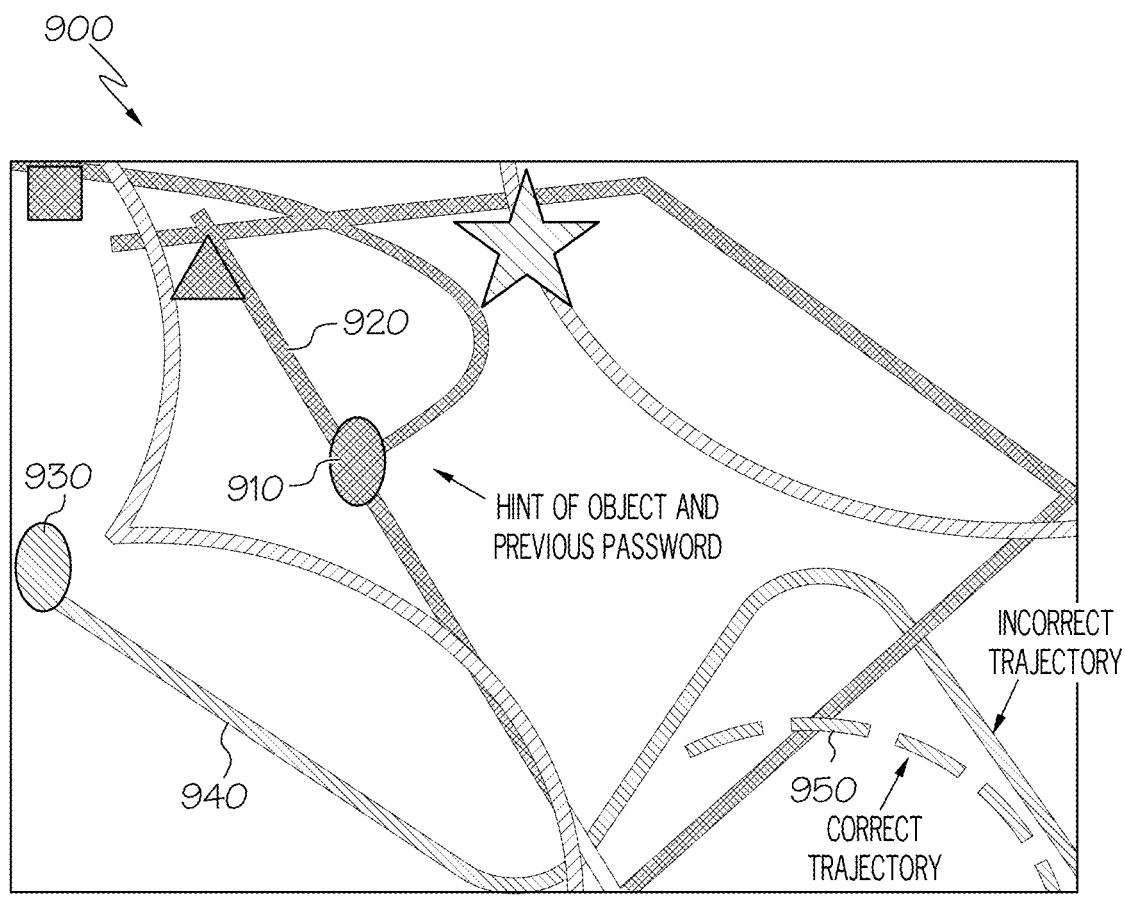
FIG. 9 depicts an example reminder image with image of non-authenticating user interaction with object according to an embodiment of the present invention.
Figure 10:
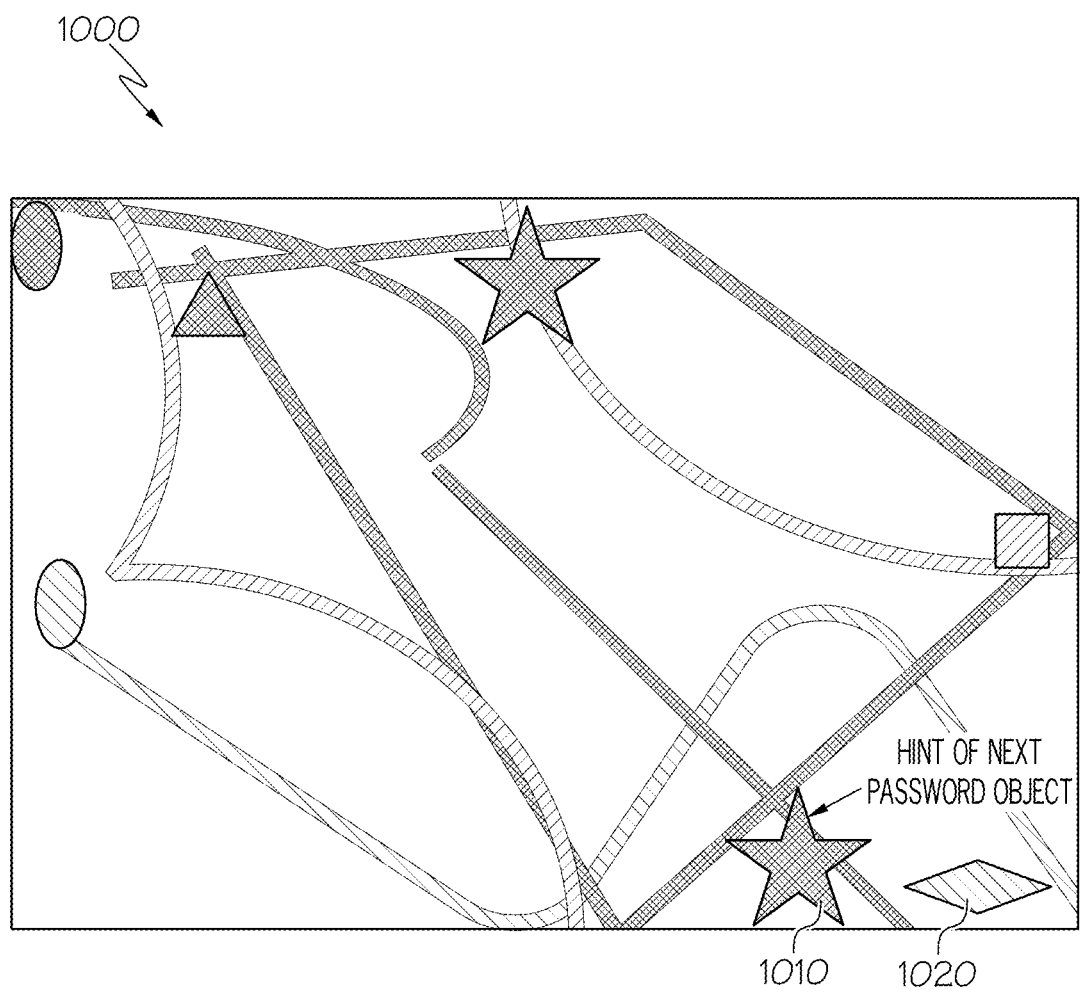
FIG. 10 depicts an example further reminder image following non-authenticating user interaction with object according to an embodiment of the present invention.

Referring now to FIG. 9 and FIG. 10, FIG. 9 illustrates a non-limiting example 900 of an expected authentication pattern as compared to an incorrect authentication pattern. Blue oval 910 and blue oval object path 920 illustrate an example of a hint of object and previous authentication pattern. Red oval 930 and red oval object path 940 illustrate an incorrect authentication action attempt wherein dashed red oval object path 950 illustrates what would have been the expected trajectory of the red oval for authentication within confidence limits. FIG. 10 is presented as a non-limiting example 1000 of a further reminder pattern provided where a user has entered an incorrect pattern, as with incorrect authentication action of red oval path 940 shown in FIG. 9. In FIG. 10, the reminder has changed and blue star 1010 is provided as a non-limiting example of a reminder object. In the example of FIG. 10, more confusion (noise or decoy) elements are added, but the user is reminded that the next pattern is with a blue star. To an outside observer, both diamond 1020 and star 1010 seem to be indicative of a reminder example, but the user is aware that diamond 1020 is not a reminder example. In another non-limiting embodiment, the authentication action pattern can have a preamble of some length from the previous authentication action.

Referring now to FIGS. 1-10, a non-limiting example is provided of an authentication action. System 12 through image display device controller 90 instructs image display device 86A-N, a holographic projector, to generate a holographic image comprising three balls of different colors lying in a straight line. In an authentication setup sequence, user 60 interacts with each ball through user hand 62 and sequentially picks up each ball, moving the balls into a shape of a triangle. All of these actions are recorded in datastore 88N (user movement) and 88A (object path) and are compared with future user authentication actions each time the user logs in. If the same holographic image of three balls had been presented to a different user in an authentication setup sequence, the different user would likely have chosen a different authentication action setup such as, for example, simply picking up one ball and then making a triangle motion with the single ball. Because of this and many other generally inherent differences, the authentication system is difficult to intuit for someone other than an authorized user. Other variants in parameters of motion include, for example, position of object, size of object, color of object, pattern of object, speed of movement, direction of movement, precision of movement, precision of location of object or movement or both, precision of speed, position of user grip on an object, or any combination of said parameters.

At a subsequent login, system 12 may again present three balls of different colors lying in a straight line but might then also include a number of other objects, including cubes, stars, diamonds, rings, etc., within the user field of view 50. Based on the previous authentication setups, the user would know to select the three balls from the straight line and arrange into a triangle. As noise, the user might additionally move other objects about user field of view 50 before, during, or after arranging the three balls into a triangle. In subsequent authentication sessions, system 12, using cognitive computing, could then provide different arrangements of various objects within the image field of view 50 for each authentication session where user 60 would nevertheless be able to discern three balls in a straight line that should be arranged into a triangle.

In another non-limiting example, the user can provide a number of authentication pathways for a series of authentications. For example, the user can generate a triangle for a first authentication, a vertical line of balls for a second authentication, a horizontal line of balls in the upper part of the field of view for a third authentication, a diagonal line of balls across the field of view for a fourth authentication, etc. The previous authentication can be used as a reminder before each subsequent authentication session.

As another non-limiting example, the user can increase the speed of arranging the balls into a triangle for each subsequent authentication session where the previous speed of movement of the balls would provide the user with a reminder and a guide for the next authentication movement.

In another non-limiting example, a holographic character image can be generated in which a character is seen in field of view 50 moving around and making sounds associated with the character (such as dog barking, duck quacking, donkey braying, person singing, etc.). In generating a series of authentication actions, one user might choose initially to cover the character's snout, beak, or mouth (such as dog, duck, donkey, or person) and not let it make its characteristic sound (such as barking, quacking, braying, or singing). A different user might choose to hold the character's body and not let it move around in field of view 50. Another user might push the character from the top to make it sit, among many other possible variants of action. Nonetheless, a user's actions can be recorded and used as a basis for future authentication, if the user so directs system 12 or if system 12 is so programmed.

In a further non-limiting example, if a user chooses a holographic moving and sound-making character as the user's holographic image, the user might set up a series of authentication patterns using the moving and sound-making character. As an example, a first reminder pattern might correspond to a first in a series of authentication actions and a next reminder pattern might correspond to a next in a series of authentication patterns. Subsequently, at each authentication session, the user would be prompted with the most recent previous authentication action as a reminder of the next authentication action in the setup series.

For example, a first reminder pattern might simply be the moving and sound-making character, which would remind the user of the first authentication action, which is to cover the mouth of the character to stop the sound making. This action by the user would generate a first authentication and access would be granted by system 12. At the next authentication, for example, the user can require the character be flipped over from head to foot (or tail) along the left-to-right axis. The reminder for this action would be an image of the previous action, namely, a hand covering the mouth of the character. At the next authentication, for example, the user can require the character be spun (rotated) around the anterior-posterior axis of the character. The reminder for this action would be an image of the previous action, namely, flipping the character over from head to foot (or tail). At the next authentication, for example, the user can require the character to be pushed down from above, and at the next authentication, the user can require the character be lifted up from below. Next, the user might require the character to be gently swung from side to side while the user holds the feet or tail of the character. Serial reminders at a given authentication, for example, could include the most recent previous authentication action, followed by the next most recent authentication action, if necessary, for prompting user recollection, followed by the then next most recent authentication action, and so on, until all previous authentication actions have been revealed (thereby reducing the number of options within a given serial authentication setup that the user might need to remember by serially eliminating previous options).

As another example, system 12 through image device controller 90 can present in a bounded user field of view 50, a blue cube, a red star, an orange diamond, a green sphere, and a purple ovoid. The user can choose to place each object in a horizontal line from the blue cube to the purple ovoid, respectively. For setup of a first authentication, the user can move the blue cube into a space in the field of view that is free of other objects. The user can then move the blue cube in a sine wave from 0° to 360° of the sine function as a first authentication action. As a second authentication action, the user can then move the red star into a space in the field of view that is free of other objects and move the red star in a sine wave from 0° to 360° of the sine function. The user can then repeat this with each object in the line through to the purple ovoid. The user can then notify system 12 that a reminder at each authentication session can be the motion track of the previous authentication session and that the reminder for the first authentication session will simply be the line of objects as set forth above. The user can additionally notify system 12 that the authenticating sine wave should be generated within confidence limits from a sine wave where $r^2$ is greater than 0.7. At each in a series of five authentication sessions, system 12 provides the noted reminder pattern and authenticates the user if the user moves the proper object in a sine wave within the defined confidence limits.

Continuing this example, a cognitive computer can learn from the series of five authentication sessions entered by the user and five authentication sessions resulting therefrom and can then propose further authentication actions based on the same series of authentications. For example, the cognitive computer can, following the first five authentication sessions set up by the user, add a new line of objects, wherein the user would intuitively understand that each of the new five objects should be chosen in succession for the next five authentication sessions and that each object should be moved in a sinusoidal movement within confidence limits where $r^2$ is more than 0.7.

While shown and described herein as an approach for authentication of a user of a computer system by displaying holographic objects in a field of view of a user, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for controlling an operation of authentication of a user of a computer system by displaying objects in a field of view of a user. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for authentication of a user of a computer system by displaying objects in a field of view of a user. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit can be implemented as a hardware circuit comprising custom VLSI circuits or gate arrays, off-the-shelf semiconductors such as logic chips, transistors, or other discrete components. A system or unit can also be implemented in programmable hardware devices such as field programmable gate arrays, programmable array logic, programmable logic devices or the like. A system or unit can also be implemented in software for execution by various types of processors. A system or unit or component of executable code can, for instance, comprise one or more physical or logical blocks of computer instructions, which can, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices and disparate memory devices.

Furthermore, systems/units can also be implemented as a combination of software and one or more hardware devices. For instance, system 72 can be embodied in the combination of a software executable code stored on a memory medium (e.g., memory storage device). In a further example, a system or unit can be the combination of a processor that operates on a set of operational data.

As noted above, some of the embodiments can be embodied in hardware. The hardware can be referenced as a hardware element. In general, a hardware element can refer to any hardware structures arranged to perform certain operations. In one embodiment, for example, the hardware elements can include any analog or digital electrical or electronic elements fabricated on a substrate. The fabrication can be performed using silicon-based integrated circuit (IC) techniques, such as complementary metal oxide semiconductor (CMOS), bipolar, and bipolar CMOS (BiCMOS) techniques, for example. Examples of hardware elements can include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments can be embodied in software. The software can be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention can also be a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for authentication of a user of a computer system by displaying objects in a bounded field of view of a user. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for authenticating a user of a computer system, wherein the computer system comprises at least one holographic image display device and at least one user monitoring device, the method comprising:

displaying, in response to a request for access by a user and via the at least one holographic image display device, one or more real-world holographic objects in a field of view of at least one user;

identifying via data received from said at least one user monitoring device, movement of the at least one user interacting with the displayed one or more holographic objects;

comparing the identified user movement to a predefined set of authentication information for the at least one user that links user authentication to a movement defined within confidence limits of the at least one user interacting with the displayed one or more holographic objects; and when the identified user movement indicates the at least one user interacted with the displayed one or more objects within the defined confidence limits, then authenticating the user.

2. The method of claim 1, wherein said predefined set of authentication information varies between each previous and subsequent authentication.

3. The method of claim 1, wherein said predefined set of authentication information varies between each previous and subsequent authentication based on user entry at setup of a plurality of defined movements, each of the defined movements corresponding to one in a series of authentications anticipated to follow setup.

4. The method of claim 3, wherein the user is provided a reminder image pattern comprising a reminder of the required predefined set of authentication information for a given authentication.

5. The method of claim 4, wherein a cognitive computer system varies said predefined authentication information for each authentication based on a database of possible defined movements provided by the user at setup or a database of personal history of defined movements of the user or both and provides a reminder image therefore.

6. The method of claim 1, wherein said defined movement is characterized by parameters selected from a group, consisting of: position of object, size of object, color of object, pattern of object, speed of movement, direction of movement, precision of movement, precision of location of object or movement or both, precision of speed, and position of user grip on an object.

7. The method of claim 1, wherein said defined movement comprises a preamble pattern comprising at least a portion of the defined movement required for the previous authentication, a core authentication pattern, and an ending pattern comprising noise.

8. A computer system for authenticating a user, comprising:
a holographic image display device;
a user monitoring device;
a memory medium comprising instructions;
a bus coupled to the memory medium; and
a processor coupled to the bus that when executing the instructions causes the system to perform a method, comprising:
displaying, in response to a request for access by a user and via the at least one holographic image display device, one or more real-world holographic objects in a field of view of at least one user;
identifying via data received from said at least one user monitoring device movement of the at least one user interacting with the displayed one or more holographic objects;
comparing the identified user movement to a predefined set of authentication information for the at least one user that links user authentication to a movement defined within confidence limits of the at least one user interacting with the displayed one or more holographic objects; and
when the identified user movement indicates the at least one user interacted with the displayed one or more holographic objects within the defined confidence limits, then authenticating the user.

9. The computer system of claim 8, wherein said predefined set of authentication information varies between each previous and subsequent authentication.

10. The computer system of claim 8, wherein said predefined set of authentication information varies between each previous and subsequent authentication based on user entry at setup of a plurality of defined movements, each of the defined movements corresponding to one in a series of authentications anticipated to follow setup.

11. The computer system of claim 10, wherein the user is provided a reminder image pattern comprising a reminder of the required predefined set of authentication information for a given authentication.

12. The computer system of claim 11, wherein a cognitive computer system varies said predefined authentication information for each authentication based on a database of possible defined movements provided by the user at setup or a database of personal history of defined movements of the user or both and provides a reminder image therefore.

13. The computer system of claim 8, wherein said defined movement is characterized by parameters selected from a group, consisting of: position of object, size of object, color of object, pattern of object, speed of movement, direction of movement, precision of movement, precision of location of object or movement or both, precision of speed, and position of user grip on an object.

14. The computer system of claim 8, wherein said defined movement comprises a preamble pattern comprising at least a portion of the defined movement required for the previous authentication, a core authentication pattern, and an ending pattern comprising noise.

15. A computer program product embodied in a computer readable storage medium that, when executed by a computer device, performs a method for authenticating a user of a computer system comprising at least one image display device and at least one user monitoring device, the method comprising:
displaying, in response to a request for access by a user and via the at least one image display device, one or more real-world holographic objects in a field of view of at least one user;
identifying via data received from said at least one user monitoring device movement of the at least one user interacting with the displayed one or more objects;
comparing the identified user movement to a predefined set of authentication information for the at least one user that links user authentication to a movement defined within confidence limits of the at least one user interacting with the displayed one or more holographic objects; and
when the identified user movement indicates the at least one user interacted with the displayed one or more objects within the defined confidence limits, then authenticating the user.

16. The computer program product of claim 15, wherein said predefined set of authentication information varies between each previous and subsequent authentication.

17. The computer program product of claim 15, wherein said predefined set of authentication information varies between each previous and subsequent authentication based on user entry at setup of a plurality of defined movements, each of the defined movements corresponding to one in a series of authentications anticipated to follow setup.

18. The computer program product of claim 17, wherein the user is provided a reminder image pattern comprising a reminder of the required predefined set of authentication information for a given authentication.

19. The computer program product of claim 18, wherein a cognitive computer system varies said predefined authentication information for each authentication based on a database of possible defined movements provided by the user at setup or a database of personal history of defined movements of the user or both and provides a reminder image therefore.

20. The computer program product of claim 15, wherein said defined movement is characterized by parameters selected from a group consisting of: position of object, size of object, color of object, pattern of object, speed of movement, direction of movement, precision of movement, precision of location of object or movement or both, precision of speed, and position of user grip on an object.

* * * * *